United States Patent [19]

Fitzpatrick et al.

[11] 3,873,581

[45] Mar. 25, 1975

[54] PROCESS FOR REDUCING THE LEVEL OF CONTAMINATING MERCURY IN AQUEOUS SOLUTIONS

[75] Inventors: Joseph William Fitzpatrick, Toms River; Carl Johannes Berninger, Pine Beach; Dennis Osborne Lewis, Toms River, all of N.J.

[73] Assignee: Toms River Chemical Corporation, Toms River, N.J.

[22] Filed: Sept. 8, 1972

[21] Appl. No.: 287,397

Related U.S. Application Data

[63] Continuation-in-part of Ser. No. 191,534, Oct. 21, 1971, abandoned.

[52] U.S. Cl. ............... 260/370, 210/24, 423/101
[51] Int. Cl. .............................................. C09b 1/00
[58] Field of Search ................................... 260/370

[56] References Cited
UNITED STATES PATENTS 2,999,869   9/1961   Donaldson ........................ 260/370

FOREIGN PATENTS OR APPLICATIONS 138,614    1/1960   U.S.S.R. ............................. 260/370
129,655    7/1960   U.S.S.R. ............................. 260/370
1,469,997  1/1967   France ......................... 260/47 S PR
128,864    6/1960   U.S.S.R. ............................. 260/370

OTHER PUBLICATIONS

Itaya, as cited in Chem. Abstracts, 72, 35540q (1970).
Zverev, Russian 142961, as cited in Chem. Ab. 56, 13979–13980 (1962).
Soba to Enso, "Elimination of Mercury from Waste Water," 21(6), 216–29 (1970).

Primary Examiner—Lorraine A. Weinberger
Assistant Examiner—E. Jane Skelly
Attorney, Agent, or Firm—Joseph G. Kolodny; Edward McC. Roberts; Prabodh I. Almaula

[57] ABSTRACT

The mercury content of an aqueous solution contaminated by mercury can be reduced by treating the solution with a mercury-reactive factor and an adsorbent such as activated charcoal.

15 Claims, No Drawings

PROCESS FOR REDUCING THE LEVEL OF CONTAMINATING MERCURY IN AQUEOUS SOLUTIONS

This application is a continuation-in-part of application Ser. No. 191,534, filed Oct. 21, 1971, now abandoned.

DESCRIPTION OF THE PRIOR ART

The prior art literature related to the removal of mercury from aqueous systems is rather sparse.

Russian patent No. 128,864, November, 1960, teaches that aqueous solutions can be freed of organo mercury contaminants by heating with sulfuric acid at a temperature of 100°C to convert the mercury to the sulfate salt and thereafter adding thiosulfate (at 100°C) to remove the mercury as the sulfide. The solution is thereafter made alkaline to insure complete precipitation of the mercury sulfide.

Russian patent No. 138,614, issued in 1960, teaches that mercury can be removed from solutions of anthraquinone-1-sulfonic acid by using fine shavings of iron or copper at temperatures below 60°C.

Russian patent No. 129,655, issued in 1960, teaches that mercury can be removed from solutions of anthraquinone-1-sulfonic acid by treating the solution, at a temperature below 60°C, with iron or copper shavings in the presence of anthraquinone crystals which adsorb the mercury. The anthraquinone is present in an amount equal to the mercury in the system being treated.

U.S. Pat. No. 2,900,397, teaches that mercury can be removed from an anthraquinone sulfonate by slurrying a salt there of in water containing from 4.5 to 5 mols of potassium iodide per mol of mercury present in the anthraquinone sulfonate salt and boiling for about 2 hours.

U.S. Pat. No. 2,999,869, teaches that the mercury content of 1,8-anthraquinone disulfonate can be reduced by adding finely divided metallic copper to the diluted sulfonation liquor after removal of the 1,5-anthraquinone disulfonate.

More recently, German Offenlegenschrifft, 1,958,169, May 19, 1971, teaches that mercury can be removed from alkaline solutions by using a reducing agent such as hydrazine. Thus, a contaminated solution is adjusted to pH/8 and treated with hydrazine followed by flocculation with calcium chloride and filtration.

Again, a Japanese article entitled "Elimination of Mercury From Waste Water" in *Soda to Enso*, 1970, 21(6), 216–29, discusses the problem attending the removal of mercury from caustic chlorine effluent. The process steps involve filtration of the liquid followed by treatment with hydrochloric acid and aluminum, attended by absorption of any vaporized mercury. The solution is thereafter filtered to remove particulate matter, after which the solution is chlorinated to assure conversion of all mercury. The pH is then raised to about 10 to precipitate any mercury as the insoluble oxide. Carbon is added and the alkaline solution filtered.

The current literature is replete with discussions of mercury contamination of aqueous effluents from manufacturing plants and the deleterious effect thereof on the environment. Unfortunately, the existing technology is in many cases incapable of reducing the mercury content in various aqueous effluents to a level which complies with the increasingly stringent dictates of Federal and State Governmental Agencies. By the process of this invention, it is possible to reduce the mercury content in a variety of aqueous systems to levels as low as one part per million while at the same time eliminating many of the disadvantages of the prior art processes.

DESCRIPTION OF THE INVENTION

Broadly, the invention involves treating an aqueous solution containing mercury with a mercury-reactive factor, adding an adsorbent, filtering and recovering a solution having reduced mercury content.

More narrowly, the invention involves treating an aqueous acid solution. Additionally, the invention involves treating solutions of anthraquinone sulfonations and the process effluents therefrom with a mercury-reactive factor, adding an adsorbent and filtering to recover a product having reduced mercury content.

In one embodiment of the invention a combination of mercury-reactive factors is used. In another embodiment, the adsorbent can be impregnated with a mercury-reactive factor. In yet another embodiment the treated liquid can be treated a second, third, fourth etc. time to further reduce the mercury content.

The process of this invention is quite simple and surprisingly efficient. As indicated, an aqueous solution contaminated with mercury is treated with a mercury-reactive factor, an adsorbent and filtered. Typically, the mercury-reactive factor is added to the solution and the mixture stirred. The adsorbent can be added together with the mercury-reactive factor or it can be added at a period subsequent to such addition. The mixture thus formed can be stirred for a suitable period of time and, following this contact period, the solution can be separated, as by filtration. The solution recovered displays a reduced mercury content. The recovered solution can be subsequently treated a second time in the manner indicated in the event that the first treatment does not reduce the mercury content to a sufficiently low level. Alternatively, the solution can be subsequently treated by passing it through a bed of an adsorbent such as activated charcoal.

As used herein the term "mercury-reactive factor" embraces those compounds, composites, or elements, as well as mixtures and/or combinations thereof that are capable of one or more of: reducing mercury to metallic mercury, precipitating mercury as an insoluble salt or complexing the mercury.

Thus, as the mercury-reactive factor there can be used metals, such as tin, magnesium, copper, iron, zinc and aluminum, sulfide-generating agents such as the alkali metal sulfides and thiosulfates exemplified by sodium sulfide and sodium thiosulfate, thiocarbamyl derivatives such as thioformamide, and compounds having the structural formula

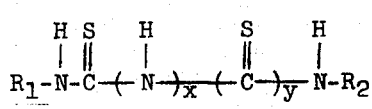

in which
$x$ is 0 or 1
$y$ is 0 or 1

$R_1$ and $R_2$ each independently are phenyl, lower alkyl or hydrogen and, in the case where $R_2$ is phenyl, $y = 0$ and $x = 1$, $R_1$ together with the adjacent nitrogen atom forms

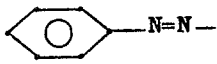

and exemplified by thiourea, diphenylthiourea thioacetamide, dithiooxamide, 2,4-dithiobiuret, thiosemicarbazide and dithizone; additionally in the case when $R_2$ is hydrogen, $x = 1$, $y = 1$ and $R_1$ is

there is obtained trithiobiuret;

Thiol or mercapto agents containing one or more —SH groups such as the aliphatic, cycloaliphatic, aromatic and heterocyclic thiols and polythiols. Thus, there can be used the aliphatic thiols, preferably polythiols containing from two to 15 carbon atoms, for example, all members of the series ethane-1,2-dithiol to dodecane-1,12-dithiol exemplified by ethane-1,2-dithiol, propane-1,2-dithiol, propane-1,3-dithiol, hexane-1,2-dithiol, hexane-1,3-dithiol, hexane-1,4-dithiol, hexane-1,5-dithiol, hexane-1,6-dithiol, hexane-2,3-dithiol, hexane-2,4-dithiol, hexane-2,5-dithiol, hexane-3,4-dithiol, etc. These compounds can be further substituted by such groups as carboxylic acid and hydroxyl. These thioalkanols and alkanoic acids are exemplified by 2,3-dimercaptopropanol, 2,3-dimercaptopropane-diol, 2,3-dimercaptopropionic acid and dithiosorbitol. Other aliphatic compounds include the $\alpha$, $\alpha'$-dimercapto (aliphatic) acids such as $\alpha,\alpha'$-dimercaptosuccinic acid and such carbohydrate derivatives as 1,4-3,6-dianhydro-2,5-dithio-D-mannitol.

Among the aliphatic thiol and mercapto compounds it is preferred to use the thiol and mercapto derivatives of $C_2-C_{10}$ organic acids, exemplified by thioacetic acid, mercaptoacetic acid, 2-mercaptopropionic acid, mercaptosuccinic acid, 2-amino-3-mercaptopropionic acid, and lauryl thioglycolate.

Useful cycloaliphatic polythiols are those containing from 4 to 8 or more carbon atoms and are exemplified by cyclopentane-1,2-dithiol and cyclohexane-trans-1,2-dithiol.

Among the aromatic thiols and mercaptans which can be successfully employed, are the aromatic thiols containing from 6 to 12 carbon atoms in the aromatic nucleus, particularly the benzene and naphthalene thiols and dithiols such as thiophenol, toluenethiol etc., benzene-1,2-dithiol, toluene-3,4-dithiol, o-, p- and m-xylylene dithiol and naphthalene-1,2-dithiol. Thiol and mercapto derivatives of aromatic acids preferably a benzene carboxylic acid such as dithioterephthalic acid and mercaptosalicylic acid are also notably useful.

Among the useful heterocyclic thiol and mercapto compounds are those containing from 5 to 13 atoms in the nucleus whose members are selected from carbon, oxygen, sulfur and nitrogen. Thus, the thiol and dithiol derivatives of thiophene, benzothiophene, naphthothiophene, thianthrene, furan, benzofuran, xanthene, phenoxathiin, pyrrole, imidazole, pyridine, pyrazine, indole, quinoline, quinoxaline, carbazole, acridine, phenazine, piperidine, pyrimidine, morpholine, thiazole, pyran, triazine, etc. The quinoxalines, triazines and benzthiazoles, as exemplified by 2,3-quinoxaline dithiol, trithiocyanuric acid and 2-mercaptobenzthiazole have been found to be particularly useful.

Other polythiol compounds useful herein are described in Volume 1, Organic Sulfur Compounds, edited by N. Kharasch (Pergamon Press, New York, 1961), particularly Chapter 19, Dithiols by L. N. Owen, the teachings of which are incorporated herein by reference.

Another group of materials useful as a mercury-reactive factor herein comprises polysulfide compositions, obtained by treating a porous or adsorbent substrate such as a resin, charcoal, diatomaceous earth etc., with a mixture of sulfur, sodium sulfide and water in a manner well known in the art.

Other useful compounds, not described above, but reactive with mercury under the conditions described are exemplified by 8-hydroxyquinoline, 2-nitroso-1-naphthol and furan.

The mercury-reactive factor can be added in any convenient form. Thus, when a metal is used, it can be added in any convenient form, such as shavings, flakes, powders, granules, etc. Although particle size is not critical with respect to utility in the present process, it is preferred to use the metals in a finely divided form, this being to insure a reasonable reaction period. The other mercury-reactive agents described can be added as solutions or as divided solids.

The quantity of mercury-reactive factor added can vary over a broad range. The minimum will be that amount sufficient to reduce the mercury content while the maximum will be governed by considerations of efficiency and economy. More concretely, however, there can be added from about 0.2 to about 2 parts of metal per part of mercury present in the solution being treated. It is preferred to use from about 0.4 to about 1.5 parts of metal per part of mercury. Use of such amounts will significantly reduce the level of mercury. Where, however, further reductions are desired, the solution can be treated a second time. In such cases it is often desirable to use larger amounts of the metal, for example from one to about 40 or even more parts of metal per part of mercury. Preferably, there are used from about 5 to about 20 parts of metal per part of mercury in such second treatments. This of course represents an efficient means of treating the solution and, if desired, there can be used from one to 40 parts of metal per part of mercury in one, or in each of several treatments.

Where an agent other than a metal is employed, there can be used from about one to about 10 or even more moles of such agent per mole of mercury present. Preferably, there are used from about one to about 5 moles per mole of mercury. These ranges can be used for one or each of several treatments. Similar considerations apply when mixtures or combinations of mercury-reactive factors are used.

The mercury-reactive factor can be a single material or a combination. Thus, for example, combinations of metals and thiol, mercapto or polysulfide agents; combinations of metals and sulfide generating compounds; combinations of metals; combinations of thiol or mercapto compounds; and combinations of sulfide generating compounds with thiol or mercapto compounds can be employed successfully.

As indicated the mercury-reactive factor is employed in conjunction with an adsorbent, which can be added before, during or after the addition of the mercury-reactive factor and, if desired can be added after the mercury-reactive factor has reacted with the mercury.

The choice of adsorbent is not critical and any of the commonly used and well known adsorbents find utility in the present process. Thus, such substances which have the ability of condensing or holding other substances on a surface such as titania, alumina, silica, ferric oxide, stannic oxide, magnesium oxide, kaolin, carbon, calcium sulfate, etc., can be used. Adsorbents such as activated carbon, activated alumina, activated clay and diatomaceous earth are preferred and activated carbon is especially preferred.

The adsorbent is typically selected on the basis of such criteria as efficiency of mercury removal and ease of filtration. Additionally, the adsorbent should be inert under the conditions of use—neither dissolving nor reacting with any of the components of the solution (an exception is made where the adsorbent is impregnated with a mercury-reactive factor). The particle size of the adsorbent although not critical can be significant. Generally it is easier to employ an adsorbent having large diameter particles than one with very fine particles. This leads to faster filtration; however, particles with too large diameters do not produce the desired reduction in the mercury level. Fine particles, on the other hand, do produce acceptable reduction in the mercury content but, due to close packing, reduce the filtration rate. Mixing adsorbents and/or judicious selection of particle size can often be employed to produce the desired results.

The adsorbent particle size can be selected from a wide range, for example, from 10 to -325 mesh. Useful results are obtained where all of the particles pass through 40 mesh, from about 70 to about 95% by weight of the particles pass through a 100 mesh screen and from about 45 to 70% pass through a 325 mesh screen.

Similarly, the surface area of the adsorbent can vary widely—from one to about 1500 m$^2$/g, with good results being obtained in the range of from one to 1000 m$^2$/g, often in the range of one to 100 m$^2$/g. Some activated carbons which perform very well in this process have a surface area of from one to 10 m$^2$/g.

The adsorbent employed in this process will have a pore volumn of from 0.1 to 1.2 ml/g, more narrowly from 0.25 to 0.9 ml/g and, when the adsorbent is activated carbon it will have a density of from 0.1 to 0.5, preferably from 0.25 to 0.5.

As indicated, it is preferred to use activated carbon, which can come from a wide variety of manufacturers and be of a wide variety of kinds and types. Typical manufacturers are: American Norite Company, Jacksonville, Fla.; Atlas Chemical Industries Inc., Wilmington, Del. (Darco); Barnebey Cheney, Columbus, Ohio; Calgon Corporation, Pittsburgh, Pa. (Filtrasorb, Pittsburgh Type HGR); and Westvaco Chemical Division, Covington, Va. (Nuchar).

The quantity of adsorbent employed is not critical and can be varied within rather wide limits. The lower limit will be the amount sufficient to remove mercury. The upper limit is similarly not critical and is set by considerations of economy and material handling. Generally, the adsorbent can be added in an amount of from about 0.05 to about 50 parts of adsorbent per part of mercury present in the solution being treated. It is preferred to use from about 0.5 to about 20 parts of adsorbent per part of mercury and the use of from about 5 to 12 parts of adsorbent per part of mercury is especially preferred.

The adsorbent employed can, if desired, be impregnated with a variety of compounds capable of reacting with mercury such as, for example, sulfur and the organic compounds which are readily mercurated and which have been discussed previously in connection with the mercury-reactive factor. Thus, the mercury reactive factor can be used alone, can be used in conjunction with adsorbents and can be used in conjunction with impregnated adsorbents. It is preferred to impregnate the adsorbent with sulfur, a polysulfide, or thiol, polythiol or thiocarbamyl compound and in a particularly preferred embodiment this adsorbent is activated carbon.

The treatment of the aqueous system with a mercury reactive factor and an adsorbent in the manner indicated above results in a substantial decrease in the mercury content of the solution. Further reduction of the mercury level can be obtained by passing the liquid, which has been treated as indicated above, through a bed of activated carbon, which can be impregnated as indicated above. Alternatively, the liquid can be treated a second time according to this process, i.e. treatment with a mercury-reactive factor and adsorbent. The liquid treated a second time can, of course, be treated either a third time or can be passed through a bed of activated carbon as a final treatment.

In operation, the process of this invention is quite simple and efficient. The solution containing contaminating mercury can be adjusted to a temperature in the range of from about 20°C to 110°C, preferably from about 80° to 100°C. At temperatures above 110°C the solution boils and there is generally no benefit while at temperatures below about 20°C the process, although operable, tends to show decreased efficiency in removing mercury. The process can be carried out under acid, alkaline or neutral conditions, although it is a preferred embodiment of this invention that the pH be acid i.e. from 6 to 1 or less. Where the system is alkaline, acid can be added to obtain a more favorable pH. The mercury-reactive factor is added and the mixture preferably stirred or otherwise agitated. The adsorbent can be added together with or at a period subsequent to the addition of the precipitating or complexing agent. The solution is stirred for a suitable period of time. the period being determined on the one hand by the minimum time necessary to complete the reaction of the mercury with the mercury-reactive factor and the maximum period being governed by efficiency of the mercury removal. As indicated, the temperature of the system is preferably maintained from about 80° to 100°C during this period.

Following the contact period the solution is separated from the mercury and adsorbent by filtration. As indicated, if desired, this filtrate can be treated again or it can be passed through a bed of activated charcoal to further reduce the mercury content.

It is apparent that the process described above can be used to reduce the level of mercury and other metals in a variety of systems and effluents. Thus, effluents from the mercury cells of the caustic chlorine process, mercury amalgamation processes and mercury-catalyzed chemical reactions can be treated.

In one embodiment of the process of this invention residual mercury can be removed from solutions of anthraquinone sulfonic acids and process effluents therefrom. It is known that when anthraquinone is sulfonated in the presence of mercury or mercury compounds, sulfonation occurs almost exclusively in the alpha-positions while in the absence of mercury the anthraquinone is sulfonated in the beta-position. It is therefore the common commercial practice to employ a mercury catalyst to obtain the important dyestuff intermediates: anthraquinone-1-sulfonic acids, anthraquinone-1,5-disulfonic acid and anthraquinone-1,8-disulfonic acid as well as their respective salts. Unfortunately, considerable amounts of mercury remain combined in the anthraquinone sulfonic acids which mercury has been found to be extremely difficult to remove. Additionally, the aqueous effluent from the reactant system tends to contain an undesirable amount of mercury. Recent Government regulations have laid down very stringent requirements respecting the quantity of mercury in any process effluent and there has therefore been a strong demand in the dyestuff industry for processes which reduce mercury levels to a minimum in both the anthraquinone α-sulfonic acids and the effluents generated by the production of these materials.

Prior attempts to reduce the level of mercury in α-anthraquinone sulfonates are illustrated by U.S. Pat. No. 2,900,397 and U.S. Pat. No. 2,999,869, discussed previously. Unfortunately, the efforts of the prior art have not been entirely successful in reducing the mercury level of the anthraquinone sulfonates to a desired level. More importantly, the efforts of the prior art have not been completely successful in reducing the mercury content of the process effluents. By the application of the process techniques described herein, it is possible to reduce the mercury level of both anthraquinone sulfonates and process effluents therefrom. As indicated, this can be accomplished by employing the process described above during the normal work-up after sulfonation of the anthraquinone.

This embodiment of the invention comprises the reaction of mercury present in the acid solutions of the desired anthraquinone-α-sulfonic acid or acids with a mercury-reactive factor in the presence of an adsorbent followed by filtration, which can be with or without the use of a filter aid. It has been found that the bulk of the mercury remains with the adsorbent press cake and the filtrate, containing a very low concentration of mercury, can be worked up in the usual manner to recover the desired anthraquinone-α-sulfonic acid or acids. In those cases where an extremely low mercury level is desired, it has been found that the use of a treatment immediately after the first, is advantageous. Additionally, the supernatant liquid can be passed, in an additional step, through a bed of activated carbon to reduce the mercury content still further.

The anthraquinone sulfonation system can be treated to remove mercury at any convenient point after the desired reaction. Thus, when anthraquinone-α-sulfonate is prepared, the mercury-reactive factor, for example aluminum, cann be added immediately following the precipitation of unreacted anthraquinone and prior to filtration. In a particularly preferred embodiment of this aspect of the invention, there is added an additional amount of adsorbent, such as charcoal, during addition of the mercury-reactive factor prior to filtration and, after filtration, the filter cake containing unreacted anthraquinone, charcoal and mercury is recycled into the sulfonation reaction. It has been found that the charcoal does not have a deleterious effect on the reaction and can be subsequently removed before or after unreacted anthraquinone is precipitated. As can be seen from Example 1, treatment of the sulfonation liquor with a mercury-reactive factor and an adsorbent results in a substantial decrease in the mercury content. As indicated, the desired anthraquinone-1-sulfonate which is obtained in the form of the alkali metal salt can be further reduced in mercury content by distillation during drying of this product.

In the preparation of the disulfonates, as can be seen from Example 3 herein, the anthraquinone-1,5-disulfonic acid precipitates out of the sulfonation medium. This product is conveniently separated from the supernatant liquid. The press cake can be redissolved in water and treated with the mercury-reactive factor and adsorbent. Following this treatment the desired alkali metal anthraquinone-1,5-disulfonate can be salted out and this product, having substantially reduced mercury content, recovered.

The filtrate of this disulfonation reaction, containing the anthraquinone-1,8-disulfonic acid, can be treated, with a mercury-reactive factor and an adsorbent. Thereafter the desired alkali metal anthraquinone-1,8-disulfonate can be salted out of solution according to known procedures to yield the product, again having substantially reduced mercury content.

The invention will be described more fully in the following description of the preferred embodiments.

Description of the Preferred Embodiments

EXAMPLE 1

This example illustrates the treatment of a system wherein anthraquinone is sulfonated in the 1-position under the catalytic influence of mercury.

A 500 ml. flask fitted with a drying tube and a stirrer was charged with 43 g. oleum 25%. 3 g. sulfuric acid 96%, and 0.25 g. mercury. The mixture was heated to 70°C. and 46 g. of anthraquinone was added. The mixture was then heated to 120°C. and stirred for 4 hours. Water (140 ml.) was added bringing the total volume to 200 ml. The unreacted anthraquinone precipitated at this point. A 0.25 g. portion of aluminum powder was added to the acid slurry in one to five minutes at about 80°C.

The unreacted anthraquinone containing about 230 mg. of mercury was filtered off on a coarse sintered glass funnel. After washing and drying, the recovered anthraquinone was obtained in a normal yield of 23 g. This recovered anthraquinone was used again in the above sulfonation along with 23 g. of fresh anthraquinone. The fresh mercury charge was reduced by the amount of mercury contained in the recovered anthraquinone after drying and the results were normal.

The mother liquor from the above anthraquinone filtration contained only 25 mg. of mercury. When the aluminum treatment was omitted from the above process the mother liquor contained 202 mg. of mercury.

The desired potassium anthraquinone-1-sulfonate was obtained from the mother liquor in a typical yield of 26 g. by salting out with potassium chloride and filtering. The quality as determined by paper chromatography was acceptable. The potassium anthraquinone-1-sulfonate press cake contained about 4 mg. of mercury and the mother liquor and wash contained about 20 mg. of mercury. If the aluminum treatment was omitted, these levels were 16 mg. and 165 mg. respectively. During the drying of the potassium anthraquinone-1-sulfonate press cake at about 120°C., 60% of the remaining mercury was removed by distillation.

A variety of metals was evaluated for efficiency as a mercury-reactive factor in the presence of the unreacted anthraquinone. The results ae summerized in Table 1 below, which additionally contains the EMF of the metal involved.

Table I

| Mercury-reactive factor | Adsorbent | Hg content of mother liquor mg | EMF |
|---|---|---|---|
| — | — | 202 | — |
| Mg | Anthraquinone | 90 | +2.40 |
| Al | do. | 25 | 1.70 |
| Mn | do. | 80 | 1.10 |
| Zn | do. | 27 | 0.762 |
| Fe | do. | 30 | 0.441 |
| Sn | do. | 85 | 0.136 |
| Cu | do. | 70 | −0.344 |
| $Na_2S_2O_3$ | do. | 120 | — |
| Al | Anth + Nuchar[1] 190N | 12 | — |

[1]Nuchar 190N is an activated charcoal having a surface area of from 5 to 10 $m^2/g$, a particle size distribution where 80–95 % passes through 100 mesh and 45–65% passes through 325 mesh made by West Virginia Pulp and Paper Company, Tyrone, Pa.

found to be significantly inferior to aluminum in this system, although magnesium has a higher EMF. More surprisingly still, manganese, having an EMF between aluminum and zinc is not nearly as effective as either of them.

It should be emphasized here that when aluminum and activated charcoal are added in the presence of unreacted anthraquinone the mercury level is reduced to its lowest point. This mode represents a preferred embodiment of the invention. It has additionally been found that it makes no significant difference respecting reduction of the mercury level whether the mercury-reactive factor and adsorbent, in this case aluminum and activated charcoal, are added all at once in a single treatment, separately in a single treatment or separately in two treatments, i.e., add aluminum in the presence of unreacted anthraquinone, filter, add activated charcoal and filter again, if the total amount of each remains the same. Thus, by adding the mercury-reactive factor and adsorbent to the mother liquor in the presence of unreacted anthraquinone the process is simplified and the results are optimized.

Part 2

200 ml. of the treated mother liquor of Example 1, containing 25 mg. of mercury were treated a second time with an adsorbent and mercury-reactive factor according to the following table.

Table 2

| Mercury-reactive factor (amount in grams) | Adsorbent (amount in grams) | | Hg in Mother Liquor mg | |
|---|---|---|---|---|
| — | — | | 25 | .0 |
| Al (0.25) | Nuchar 190-N | (2) | 5 | .1 |
| $Na_2S_2O_3$ (0.25) | Nuchar 190-N | (1) | 6 | .7 |
| Al (0.25) | Pittsburgh Type HGR (Pulverized) | (2) | 5 | .0 |
| Al (0.25) | Nuchar 190-N | (1) | 5.2 | |
| Paraformaldehyde (0.25) | Pittsburgh Type HGR (Pulverized) | (1) | | |
| Al (0.25) | do. | | 5.2 | |
| hydroxylamine sulfate (0.25) | | | | |
| Al (0.25) | do. | | 5.1 | |
| $SnCl_2$ (0.25) | | | | |
| Thiourea (0.25) | do. | | 6 | .8 |
| 8-hydroxyquinoline (0.25) | do. | | 6 | .0 |
| 2,3-quinoxaline-dithiol (0.25) | do. | | 5 | .1 |
| furan (0.25) | Nuchar 190-N | (2) | 8 | .0 |
| dithizone (0.25) | do. | | 7 | .1 |
| 2-nitroso-1-naphthol (0.25) | do. | | 7 | .2 |
| 2,3-dimercaptopropanol (0.25) | do. | | 2.0 | |

It will be noted from the foregoing table that the ability of various metals to reduce the mercury content to a minimum level cannot be predicted on the basis of relative EMF. Surprisingly, for example, magnesium is From the foregoing tables, it is clear that a wide variety of agents is capable of reducing the mercury content, which reduction is enhanced by the use of activated charcoal.

EXAMPLE 2

This example illustrates the treatment of a system for preparing anthraquinone disulfonates under the catalytic influence of mercury.

A one liter flask was charged with 43 ml. of 96% sulfuric acid, 80 ml. of 20% oleum and 2.4 g. mercury. After heating to 85°C., 200 g. of anthraquinone was added. The mixture was heated to 115°C. while adding 97 ml. of 65% oleum and then to 130°C. After the reaction was held two hours at 130°C., an additional 23 ml. of 65% oleum was added dropwise followed by a further two hours at 130°–132°C. The mixture was cooled to 115°C. 60 ml. 96% sulfuric acid and 100 ml. 78% sulfuric acid were added in succession from a dropping funnel. The mixture was stirred one hour at 60°C. and anthraquinone-1,5-disulfonic acid was filtered off on a sintered glass funnel. The press cake was washed twice with 41 ml. of 86% sulfuric acid and with three 60 ml. portions of 78% sulfuric acid. The press cake weighed 204 g. and contained 75 mg. of mercury.

The filtrate and washes measured 650 ml. and contained mainly anthraquinone-1,8-disulfonic acid and 2.325 g. of mercury.

Part I — Sodium Anthraquinone-1,5-Disulfonate

The 1,5-disulfonic acid press cake from above was redissolved in 900 ml. water and heated to 85°–90°C. One gram of aluminum powder was added during five minutes and then 8 g. of Nuchar 190-N was added. After holding at 85°–90°C. for 1 hour, the Nuchar residue was filtered off on a medium sintered glass funnel and washed with 100 ml. of hot water. The filtrate and wash containing the anthraquinone-1,5-disulfonic acid analyzed for less than 0.2 mg. of mercury.

The sodium anthraquinone-1,5-disulfonate was salted out in the usual manner with sodium sulfate and a normal yield of 152 g. was obtained upon filtration and drying. The press cake contained less than 0.1 mg. of mercury. When the product was not treated to reduce the mercury level as described above, the press cake contained 40 mg. of mercury.

Part II — Potassium Anthraquinone-1,8-Disulfonate

The filtrate from the initial anthraquinone-1,5-disulfonic acid filtration was drowned into 500 ml. of water and diluted to 2 liters. This mixture was heated to 85°–90°C. and the mercury-reactive factor and adsorbent were added according to table 3 below. After addition of the mercury-reactive factor and adsorbent the solution was stirred at 85°–90°C. for 1 hour, cooled to 70°–75°C. with 880 ml. cold water and filtered on a medium sintered glass funnel. The adsorbent press cake was thereafter washed with 200 ml. of hot water. In the case when 1.6 g. of powdered aluminum and 16 g. of Nuchar 190-N were added, the filtrate and wash containing the anthraquinone 1,8-disulfonic acid analyzed for 60 mg. of mercury. When the clarification was omitted from the above process the filtrate and wash contained about 1400 mg. of mercury.

The potassium anthraquinone-1,8-disulfonate was then salted out in the usual manner with potassium sulfate and produced a normal yield of 120 g. after filtering and drying. The press cake contained 30 mg. of mercury. If the above clarification was omitted, the press cake contained 800 mg. of mercury.

The effect of the various adsorbents is compared in table 3 below.

Table 3

| Mercury-reactive factor (amount in grams) | Adsorbent (amount in grams) | | Hg in the 1,8-disulfonic acid solution mg |
|---|---|---|---|
| — | — | | 1400 |
| None | Nuchar 190-N | (16) | 1000 |
| Al (2.0) | None | | 310 |
| Al (1.6) | Nuchar 190-N | (16) | 60 |
| do. | Nuchar WV-G (Pulverized) | (16) | 31 |
| do. | Dicalite[1] | (16) | 125 |
| do. | Dicalite Darco S-51 | (16) (16) | 52 |
| do. | Dicalite Nuchar KD 2 | (16) (16) | 73 |
| do. | Dicalite Barneby Cheney JV | (16) (16) | 56 |
| do. | Dicalite Barneby Cheney JF | (16) (16) | 146 |
| do. | Dicalite Nuchar WV-G | (16) (16) | 56 |
| do. | Nuchar 190-N impregnated with thiophene[2] | (16) | 59 |
| do. | Nuchar 190-N impregnated with furan[3] | (16) | 63 |
| do. | Nuchar 190-N impregnated with 8-hydroxyquinoline[4] | (16) | 67 |
| do. | Anthraquinone (powdered) | (20) | 60 |
| Dithiooxamide (2.0) | None | | 800 |
| Al (2.0) | Nuchar 190-N | (16) | 51 |
| Al (2.0), Dithiooxamide (2.0) | None | | 240 |
| Dithiooxamide (2.0) | Nuchar 190-N | (16) | 380 |
| Al (2.0), Dithiooxamide (2.0) | Nuchar 190-N | (16) | 1 |
| Al (2.0), 2,3-Dimercaptopropanol (2.0) | do. | (16) | 1 |
| Al (2.0), Thiophenol (2.0) | do. | (16) | 23 |
| Al (2.0), 2-mercaptobenzothiazole (2.0) | do. | (16) | 29 |
| Al (2.0), Lauryl Thioglycolate (2.0) | do. | (16) | 35 |
| Al (2.0), Dithiolterephthalic acid (2.0) | do. | (16) | 2 |

Table 3 — Continued

| Mercury-reactive factor (amount in grams) | Adsorbent (amount in grams) | | Hg in the 1,8-disul-fonic acid solution mg |
|---|---|---|---|
| Al (2.0), Piperazine Dithiocarbamate (2.0) | do. | (16) | 50 |
| Al (2.0), Thioacetamide (2.0) | do. | (16) | 10 |
| Al (2.0), Sodium Sulfide (2.0) | do. | (16) | 30 |
| Al (2.0), Sulfur (2.0) | do. | (16) | 40 |
| Trithiocyanuric Acid (2.0) | None | | 840 |
| Trithiocyanuric Acid (2.0) | Nuchar 190-N | (16) | 80 |
| Trithiocyanuric Acid (2.0) Al (2.0) | None | | 145 |
| Trithiocyanuric Acid Al (2.0) (2.0) | Nuchar 190-N | (16) | 33 |

¹Dicalite is the trademark for diatomaceous earth manufactured by Grefco, Inc. Similar results were obtained with Johns Manville Filter Cel., Fibra-Flo 750, Fibra-Flo F4C, Fibra-Flo 5C, and Celkate T21.
²The thiophene impregnated carbon was prepared by slurrying 16 g. of Nuchar 190-N in thiophene and filtering off the supernatant liquid. The produce was used directly in this experiment.
³The carbon was impregnated with furan in the same manner as the impregnation with thiophene.
⁴The Nuchar 190-N was impregnated with 8-hydroxyquinoline by dissolving 2 g. of 8-hydroxyquinoline in 100 ml. of ethyl alcohol and thereafter adding 16 g. of Nuchar 190-N. The mixture was stirred for 1 hour at 23–28°C. and the alcohol was thereafter removed by distillation. The residue was used in this run. Similar results are obtained with 8-mercaptoquinoline diethyldithio phosphoric acid, dithizone, 2-nitroso-naphthol, and 2,3-quinoxalinedithiol.

It can be seen from Table 3 that although substantial reductions in the mercury content can be realized with aluminum and a variety of adsorbents, truly surprising results are obtained when aluminum is used in conjunction with a thiocarbamate, aromatic thiol, aromatic thioacid or aliphatic dithiol and an adsorbent.

Part III

The filtrate from the initial anthraquinone-1,5-disulfonic acid filtration was drowned into 500 ml. of water and diluted to 2-liters. The mixture was heated to 88°–93°C. and 1.9 g of aluminum powder added. After stirring at 88°–93°C. for ½ hour, an additional mercury-reactive agent was added according to the table below. Stirring was continued at 88°–93°C. for a further ½ hour before the mixture was diluted with 480 mls. of cold water and filtered off on a 6 cm. sintered glass funnel precoated to a depth of ¼ inch with Nuchar 190-N. The cake was then washed to a filtrate volume of 2.65 liters. A sample of this filtrate was submitted for mercury analysis.

The potassium anthraquinone-1,8-disulfonate was then salted out in the usual manner with potassium sulfate.

Table 4

| Mercury-reactive factor | Grams | Hg in the 1,8-Disulfonic Acid Soln. (mg) |
|---|---|---|
| — | — | 5.3 mg |
| Dithiooxamide | 1.9 g | 0.3 mg |
| Sodiumthiosulfate | 3.8 g | 0.6 mg |
| Thioacetamide | 1.9 g | 2.9 mg |
| Dimercaptopropanol | 2.8 g | 0.8 mg |
| Phosphorous Pentasulfide | 1.9 g | 16.0 mg |
| 2-Mercaptobenzothiazole | 2.8 g | 3.15 mg |

EXAMPLE 3

The clarified liquors in Example 2, Part II, potassium anthraquinone-1,8-disulfonate containing 60 mg. of mercury, were given a second treatment with aluminum and activated charcoal under the identical conditions as the first treatment in Example 2, Part II. In the case where 1.6 g. of aluminum and 16 g. of Nuchar 190-N were used, the filtrate and wash contained 14 mg. of mercury. After salting out in the conventional manner, the potassium anthraquinone-1,8-disulfonate contained 7 mg. of mercury. The charcoal residue from this second clarification can be recycled again or used in the first treatment, as in Example I, without loss in effectiveness. The activated charcoal employed in the second treatment can be partly or completely replaced by a sulfur impregnated carbon such as Pittsburgh Type HGR, and the mercury levels can be reduced still further. Using the reaction conditions indicated above and the relative amounts of the various reactants indicated, the following results obtained, summarized in table 5 below.

Table 5

| Mercury-reactive factor (amount in grams) | Adsorbent (amount in grams) | | Mercury in filtrate mg |
|---|---|---|---|
| — | — | | 60 |
| Al (1.6) | Nuchar 190-N | (16) | 14 |
| do. | Sulfur impregnated* Pitsburgh Type HGR (finely ground) | (16) | 5.8 |
| do. | Sulfur impregnated HGR | (12) | |
| | Nuchar 190-N | (4) | 5.0 |
| do. | Sulfur impregnated HGR | (8) | |
| | Nuchar 190-N | (8) | 4.0 |
| do. | Sulfur impregnated HGR | (4) | |
| | Nuchar 190-N | (12) | 4.0 |
| do. | Nuchar 190-N | (8) | |
| | Sulfur impregnated Nuchar 190-N | (8) | 3.8 |

*The Nuchar 190-N impregnated with sulfur was prepared according to Example 1 of U.S. Patent 3,194,629, which Example is incorporated herein by reference. Pittsburgh Type HGR carbon is supplied impregnated with sulfur.

EXAMPLE 4

The clarified liquors in Example 2, Part II, potassium anthraquinone-1,8-disulfonate, after treatment with aluminum and the adsorbent but prior to salting out of the product, together with the collected filtrate and wash was passed through a column of activated charcoal or mixture of filter aid and activated charcoal or mixture of filter aid and activated charcoal. Table 6 summarizes the column composition and the various parameters as well as the mercury content in parts per million before and after.

Table 6

| Comumn Composition | Diam. of Col. (cm.) | Depth of Col. (cm.) | Temp. During Pass (°C) | Vol. Passed (ml.) | Mercury Content (PPH) Before Pass | After Pass |
|---|---|---|---|---|---|---|
| Nuchar WV-G | 2 | 12 | 25 | 450 | 11.3 | 3.2 |
| Barnebey Cheney JV | 6 | 1.5 | 75 | 450 | 47 | 14.3 |
| Barnebey Cheney JV | 6 | 3.0 | 75 | 450 | 47 | 4.5 |
| 50%* Barn. Cheney JV 50%* Super Cel | 6 | 3.0 | 25 | 500 | 13.6 | 1.4 |
| 50%* Barn. Cheney JF 50%* Super Cel | 6 | 3.0 | 25 | 500 | 13.6 | 4.4 |
| Nuchar KD-2 | 6 | 3.0 | 80 | 500 | 34.2 | 8.4 |
| Nuchar 190 N | 6 | 2.5 | 25 | 500 | 13.6 | 0.5 |
| Pittsburgh Type HGR | 6 | 3 | 25 | 500 | 13.6 | 7.5 |
| Nuchar WV-L | 6 | 3 | 25 | 500 | 13.6 | 8 |
| Nuchar 722 | 6 | 3 | 25 | 500 | 13.6 | 5 |

*Percentages are by weight

It can be seen from the foregoing table that it is possible to reduce the mercury content of the filtrate to as low as 0.5 parts per million.

EXAMPLE 5

This Example illustrates the use of a precoated funnel in filtering the anthraquinone sulfonation liquor.

Anthraquinone was sulfonated as described in Example 2 After the sulfonation and cooling to 115°C. the reaction mass was drowned into 1800 ml. water. The reaction flask was rinsed with 31 g. sulfuric acid 96% and the drowned slurry volumn was adjusted to 2400 ml. with water. The temperature was adjusted to 90°C. and 1.44 g. of powdered aluminum and 12 g. Nuchar 190 N were added. The slurry was stirred for one to two hours and then clarified on a previously coated 12 cm. Buchner funnel. The press cake was washed three times with 50 ml. of water. The mother liquor and wash contained mainly a mixture of anthraquinone-1,5-and 1,8-disulfonic acid. The isomers were salted out with sodium sulfate and recovered in the usual manner.

The Büchner funnel was pre-coated by slurrying 50 g. Filter-Cel (Johns-Manville) in about 100 ml. of water and filtering the slurry on the 12 cm. Büchner funnel containing a Whatman No. 1 filter paper.

After the clarification, the filtrate and wash contained only 120 mg. of the 2400 mg. of mercury originally charged.

EXAMPLE 6

Anthraquinone was sulfonated as described in Example 2. After the sulfonation and cooling to 115°C. the reaction mass was drown into 1200 mls water. The reaction flask was rinsed with 31 g Sulfuric Acid 96% and the temperature of the mixture adjusted to 88°-93°C. Charges of 3.3 g of powdered aluminum and 22 g of Nuchar were then made. The slurry was stirred for ½ hour at 88°-93°C. before adding 1.1 g dithiooxamide. Two further additions of 0.55 g dithiooxamide were made at hourly intervals followed by a hold time at 88°-93°C. of 3 hours. The mixture was then clarified on a medium porosity sintered glass funnel and the cake washed with hot water to a filtrate volume of 2350 mls. This filtrate, containing a mixture of anthraquinone-15- and 18-disulfonic acids, had a mercury content of 12 mgs.

If, instead of adding the nuchar with the aluminum, it is charged one hour prior to the clarification (i.e. 2 hours after the final dithiooxamide charge) the mercury content of the above filtrate can be reduced to 3.5 mg.

Thus, although the time of addition of the mercury-reactive factor and adsorbent is not critical, it appears that the relative time of addition in this system can be regulated to optimize the results.

EXAMPLE 7

To demonstrate the proposition that this process is effective to remove mercury in a variety of forms, the following procedures were performed:

A. Mercuric sulfate, 0.74 grams was added to 350 ml. of 20% $H_2SO_4$ with stirring and the temperature was raised to 75°-80°C. Nuchar 190-N, 4.0 grams, was added and the mixture stirred at 75°-80°C., for 4 hours, at which time the mixture was filtered on a medium sintered glass funnel. The charcoal removed 47% of the mercury.

B. Experiment A above was repeated but 0.5 grams of aluminum powder were added just prior to the addition of the charcoal. Upon filtration, 87% of the mercury was removed from the solution.

C. Experiment B above was repeated but 0.5 grams of metallic mercury were used in place of mercuric sulfate. Upon filtration, 99.986% of the mercury was removed from the solution.

D. Experiment B above was repeated, using 0.82 grams of phenyl mercuric acetate in place of the mercuric sulfate. On filtration, 64% of the mercury was removed from the solution.

EXAMPLE 8

The filtration from the initial anthraquinone-1,5-disulfonic acid filtration in Example 2 Part I was drowned into 500 ml. of water and diluted to 2 liters. This mixture was heated to 85°-90°C. Aluminum (1.6 g.) and Nuchar 190-N (16 g.) were added. The reaction mixture was held for 2-3 hours at 85°-90°C. and filtered. 275 ml. portions of the filtrate thus obtained were subjected to the following treatments:

Table 7

| Mercury-reactive factor (g.) | Adsorbent (g.) | Hg in the 1,8-disulfonic acid solution (mg.) |
|---|---|---|
| — | — | 60.0 |
| Al (.1) (reference) | Nuchar 190-N (1.28) | 2.4 |
| 2,3 dimercaptopropanol (.1) (added separately) | do. | 1.5 |
| 2,3-dimercaptopropanol (.1) (Nuchar 190 N impregnated with agent) | do. | 1.5 |
| 2,3-dimercaptoquinoxaline (.1) | do. | 1.3 |
| 2-mercaptobenzothiazole (.1) | do. | 3.0 |
| mercapto resin* (.1) | do. | 2.0 |
| Thioglycolic acid (.1) | do. | 2.9 |
| Lauryl Thioglycolate (.1) | do. | 3.0 |
| mercaptosalicylic acid (.1) | do. | 2.5 |
| Dithiooxamide (.1) | do. | 1.6 |
| Dithioterephthalic acid (.1) | do. | 2.3 |

*The "mercapto resin" mentioned above is a polysulfide composition and was prepared in the following way:
A 500 ml. flask with condenser and stirring was charged with 100 ml. thionyl chloride. A 20 g. portion of amberlite IR-120 (a cross linked sulfonated polyvinyl benzene polymer marketed as a cation exchange resin by Rohm and Haas Company) was added slowly and the mixture refluxed until the sulfur dioxide stopped coming off. The mixture was cooled and filtered to give 15 g. of resin having sulfonyl chloride functional groups.
The entire yield of resin from above was subjected to a solution of sodium polysulfide prepared in the usual way from sulfur, sodium sulfide and water. The mixture was held for 16 hours at 50°C. A yield of 14 g. of mercapto resin was obtained.

It is seen that the mercury level of the solution is significantly reduced. Further, these agents can be used in conjunction with the adsorbent, or can be impregnated into the adsorbent, without loss of efficiency. Note in this connection the effect of adding 2,3-dimercaptopropanol separately and impregnated on activated charcoal.

We claim:

1. A process for removing mercury from aqueous solutions of anthraquinone sulfonic acids and their aqueous process effluents which comprises treating the aqueous solution or effluent with
    a. at least one mercury-reactive factor selected from the group consisting of
        i. tin, magnesium, copper, iron, zinc and aluminum,
        ii. an alkali metal sulfide or thiosulfate, and a polysulfide composition obtained by treating a porous substrate with sulfur, sodium sulfide and water,
        iii. thiourea, dithizone, dithiooxamide, thioacetamide, dithiobiuret, diphenylthiourea, thiosemicarbazide and trithiobiuret,
        iv. an alkane dithio or hydroxyalkane dithiol containing 2 to 12 carbon atoms,
        v. thio and mercapto derivatives of $C_2$-$C_{10}$ organic acids,
        vi. thiophenol, toluenethiol, benzenedithiol, toluenedithiol, xylene dithiol, dithioterephthalic acid and mercaptosalicyclic acid,
        vii. 2,3-quinoxaline dithiol, trithiocyanuric acid and 2-mercaptobenzthiazole,
        viii. 8-hydroxyquinoline, 2-nitroso-1-naphthol and furan, and
    b. an adsorbent selected from the group consisting of titania, alumina, silica, ferric oxide, stannic oxide, magnesium oxide, kaolin, carbon, activated carbon, activated alumina, activated clay and diatomaceous earth.

2. A process according to claim 1 in which the adsorbent comprises activated carbon.

3. A process according to claim 1 in which the adsorbent comprises activated carbon which may be impregnated with sulfur, polysulfide composition, thiophene, furan, 8-hydroxyquinoline, 8-mercaptoquinoline, diethyldithiophosphoric acid, dithizone, 2-nitroso-1-naphthol, or 2,3-quinoxalinedithiol.

4. A process according to claim 1 in which the mercury-reactive factor is selected from
    i. aluminum, zinc and iron,
    ii. sodium thiosulfate, sodium sulfide, and a polysulfide composition obtained by treating a porous substrate with sulfur, sodium sulfide and water,
    iii. thiourea, dithizone, dithiooxamide and thioacetamide,
    iv. 2,3-dimercaptopropanol,
    v. thioglycollic acid, mercaptoacetic acid, 2-mercaptopropionic acid, mercaptosuccinic acid, 2-amino-3-mercaptopropionic acid and lauryl thioglycolate,
    vi. thiophenol, toluenethiol, benzenedithiol, toluenedithiol, xylene dithiol, dithioterephthalic acid and mercaptosalicyclic acid,
    vii. 2,3-quinoxaline dithiol, trithiocyanuric acid and 2-mercaptobenzthiazole,
    viii. 8-hydroxyquinoline, 2-nitroso-1-naphthol and furan.

5. A process according to claim 4 in which the adsorbent is activated carbon.

6. A process according to claim 5 in which the mercury reactive factor is selected from one or more of aluminum powder, dithiooxamide, sodium thiosulfate, 2-mercaptobenzthiazole, trithiocyanuric acid, dithioterephthalic acid, 2,3-dimercaptopropanol, sodium sulfide, 8-hydroxyquinoline, 2-nitroso-1-naphthol and furan.

7. A process according to claim 6 in which the mercury reactive factor is aluminum and the adsorbent is activated carbon.

8. A process according to claim 1 in which the solution is treated a second time to further reduce the mercury content.

9. A process according to claim 1 in which the solution treated contains at least one of anthraquinone-1-sulfonate, anthraquinone-1,5-disulfonate or anthraquinone-1,8-disulfonate.

10. In a process for sulfonating anthraquinone in the 1-position wherein mercury and mercury compounds catalyze the reaction, the improvement which comprises treating a solution containing the 1-sulfonated product with
   a. at least one mercury-reactive factor selected from the group consisting of
      i. tin, magnesium, copper, iron, zinc and aluminum,
      ii. an alkali metal sulfide or thiosulfate, and a polysulfide composition obtained by treating a porous substrate with sulfur, sodium sulfide and water,
      iii. thiourea, dithizone, dithiooxamide, thioacetamide, dithiobiuret, diphenylthiourea, thiosemicarbazide and trithiobiuret,
      iv. an alkane dithiol or hydroxyalkane dithiol containing 2 to 12 carbon atoms,
      v. thio and mercapto derivatives of $C_2$–$C_{10}$ organic acids,
      vi. thiophenol, toluenethiol, benzenedithiol, toluenedithiol, xylene dithiol, dithioterephthalic acid and mercaptosalicyclic acid,
      vii. 2,3-quinoxaline dithiol, trithiocyanuric acid and 2-mercaptobenzthiazole,
      viii. 8-hydroxyquinoline, 2-nitroso-1-naphthol and furan, and
   b. an adsorbent selected from the group consisting of titania, alumina, silica, ferric oxide, stannic oxide, magnesium oxide, kaolin, carbon, activated carbon, activated alumina, activated clay and diatomaceous earth, and filtering to provide a solution having reduced mercury content.

11. A process according to claim 10 in which the mercury reactive factor and the adsorbent are added just after unreacted anthraquinone is precipated out of solution.

12. A process according to claim 11 in which the mercury reactive factor is aluminum and the adsorbent is activated carbon.

13. A process according to claim 12 in which the mercury reactive factor is aluminum and the adsorbent is activated carbon and the filter cake left after filtration is recycled to the sulfonation reaction.

14. In a process for disulfonating anthraquinone in the α-position wherein mercury and mercury compounds catalyze the reaction, the improvement which comprises treating a solution containing 1,8-disulfonated product with
   a. at least one mercury-reactive factor selected from the group consisting of
      i. tin, magnesium, copper, iron, zinc and aluminum,
      ii. an alkali metal sulfide or thiosulfate, and a polysulfide composition obtained by treating a porous substrate with sulfur, sodium sulfide and water,
      iii. thiourea, dithizone, dithiooxamide, thioacetamide, dithiobiuret, diphenylthiourea, thiosemicarbazide and trithiobiuret,
      iv. an alkane dithiol or hydroxyalkane dithiol containing 2 to 12 carbon atoms,
      v. thio and mercapto derivatives of $C_2$–$C_{10}$ organic acids,
      vi. thiophenol, toluenethiol, benzenedithiol, toluenedithiol, xylene dithiol, dithioterephthalic acid and mercaptosalicyclic acid,
      vii. 2,3-quinoxaline dithiol, trithiocyanuric acid and 2-mercaptobenzthiazole,
      viii. 8-hydroxyquinoline, 2-nitroso-1-naphthol and furan, and
   b. an adsorbent selected from the group consisting of titania, alumina, silica, ferric oxide, stannic oxide, magnesium oxide, kaolin, carbon, activated carbon, activated alumina, activated clay and diatomaceous earth, and filtering to recover a solution having reduced mercury content.

15. In a process for disulfonating anthraquinone in the α-position wherein mercury and mercury compounds catalyze the reaction, the improvement which comprises treating a solution containing 1,5-disulfonated product with
   a. at least one mercury-reactive factor selected from the group consisting of
      i. tin, magnesium, copper, iron, zinc and aluminum,
      ii. an alkali metal sulfide or thiosulfate, and a polysulfide composition obtained by treating a porous substrate with sulfur, sodium sulfide and water,
      iii. thiourea, dithizone, dithiooxamide, thioacetamide, dithiobiuret, diphenylthiourea, thiosemicarbazide and trithiobiuret,
      iv. an alkane dithiol or hydroxyalkane dithiol containing 2 to 12 carbon atoms,
      v. thio and mercapto derivatives of $C_2$–$C_{10}$ organic acids,
      vi. thiophenol, toluenethiol, benzenedithiol, toluenedithiol, xylene dithiol, dithioterephthalic acid and mercaptosalicyclic acid,
      vii. 2,3-quinoxaline dithiol, trithiocyanuric acid and 2-mercaptobenzthiazole,
      viii. 8-hydroxyquinoline, 2-nitroso-1-naphthol and furan, and
   b. an adsorbent selected from the group consisting of titania, alumina, silica, ferric oxide, stannic oxide, magnesium oxide, kaolin, carbon, activated carbon, activated alumina, activated clay and diatomaceous earth, and filtering to recover a solution having reduced mercury content.

* * * * *

UNITED STATES PATENT OFFICE
CERTIFICATE OF CORRECTION

PATENT NO. : 3,873,581

DATED : March 25, 1975

INVENTOR(S) : Joseph W. Fitzpatrick et al

It is certified that error appears in the above-identified patent and that said Letters Patent are hereby corrected as shown below:

In claim 1, column 17, line 50, change "dithio" to

-- dithiol --.

Signed and sealed this 27th day of May 1975.

(SEAL)
Attest:

RUTH C. MASON
Attesting Officer

C. MARSHALL DANN
Commissioner of Patents
and Trademarks